Jan. 17, 1928.  1,656,631
W. S. HAMMAKER
ROAD MACHINE FOR DISTRIBUTING CHIPS, GRAVEL, SAND, AND THE LIKE
Filed April 2, 1923  2 Sheets-Sheet 1

INVENTOR
William S. Hammaker
BY
Augustus B. Stoughton.
ATTORNEY

WITNESS:

Patented Jan. 17, 1928.

1,656,631

UNITED STATES PATENT OFFICE.

WILLIAM S. HAMMAKER, OF HARRISBURG, PENNSYLVANIA.

ROAD MACHINE FOR DISTRIBUTING CHIPS, GRAVEL, SAND, AND THE LIKE.

Application filed April 2, 1923. Serial No. 629,536.

Objects of the present invention are, first, to provide a simple, reliable, efficient and comparatively inexpensive automotive road machine for distributing chips, gravel, sand and like material (hereinafter referred to as chips) upon the surface of a road or upon like surfaces; second, to provide for inexpensively and conveniently converting any usual automobile truck into such a road machine without rendering it incapable of use as a truck; third, to provide such a road machine which, while properly functioning on an icy or like surface, will get where its users desire it to go; and fourth, to provide a machine of the character mentioned which will satisfactorily do its work of spreading without tearing up bituminous or like material in the case of treated surface work. Other objects of the invention will appear from the following description.

The invention, generally stated, may be said to consist of an automotive road machine adapted to distribute chips upon the surfaces of roads and upon like surfaces and comprising the combination of an automotive chassis including a power plant, a body mounted on the chassis and adapted to carry a load of chips and provided with laterally arranged openings for discharging chips, a chip distributor arranged at and extending across the front of the chassis, conveyors arranged at the sides of the chassis and adapted to receive chips from the openings and to deliver them to the distributor, and means for operating said parts from the power plant. The invention also comprises the improvements to be presently described and finally claimed.

In the following description reference will be made to the accompanying drawings forming part hereof and in which is illustrated one form of road machine embodying features of the invention and selected from among other forms for the sake of description.

In the drawings

Figure 1:
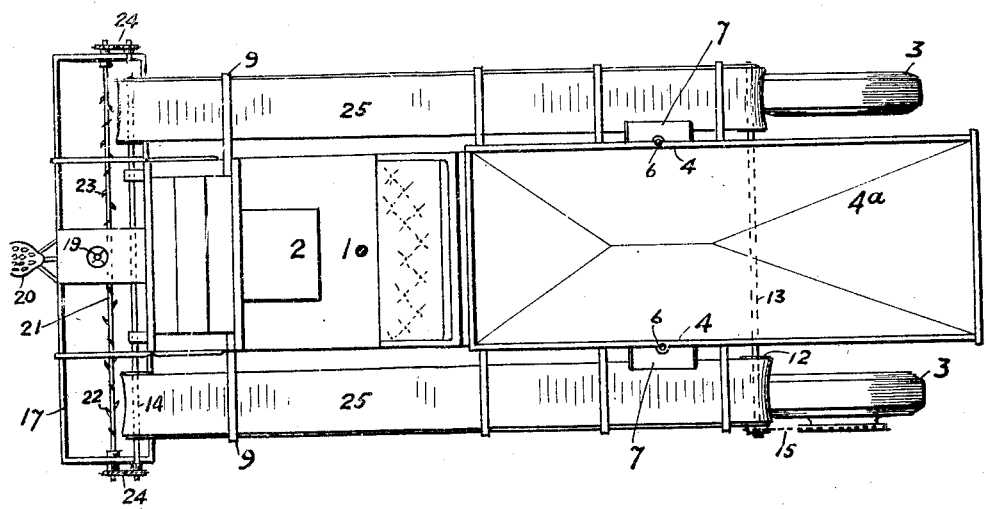
Figure 1 is a top or plan view with certain guards omitted for the sake of clearness.
Figure 2:
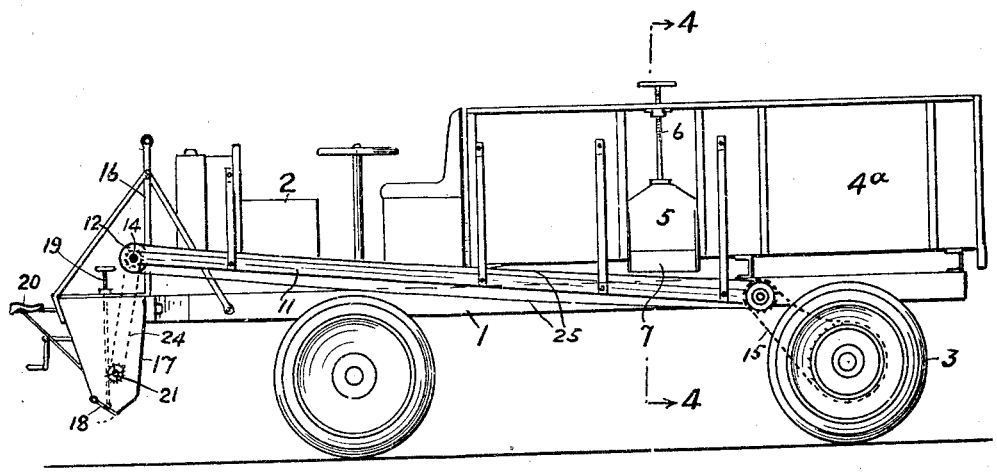
Fig. 2 is a side view of Figure 1.
Figure 3:
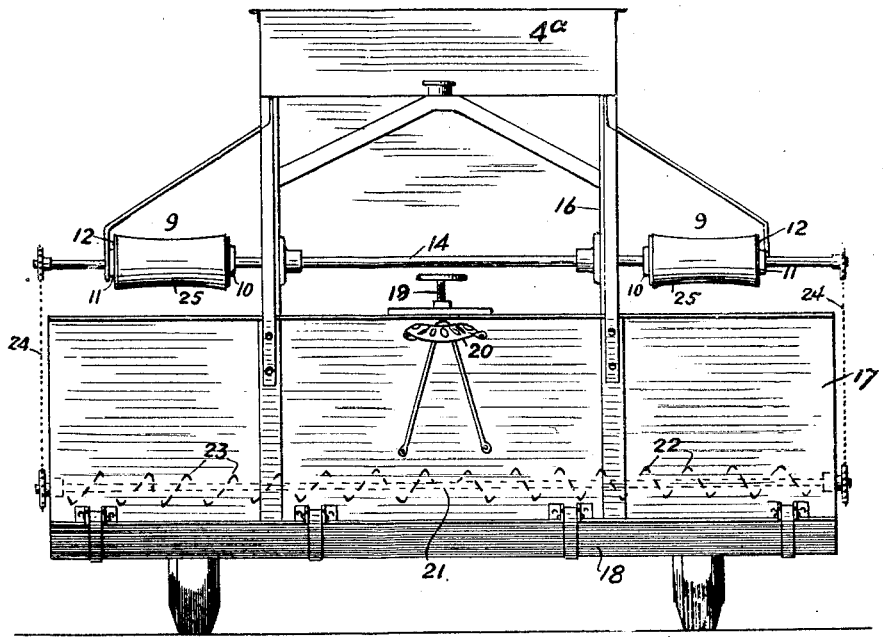
Fig. 3 is a front view drawn to an enlarged scale with parts of the belts or belt conveyors omitted for the sake of clearness.
Figure 4:
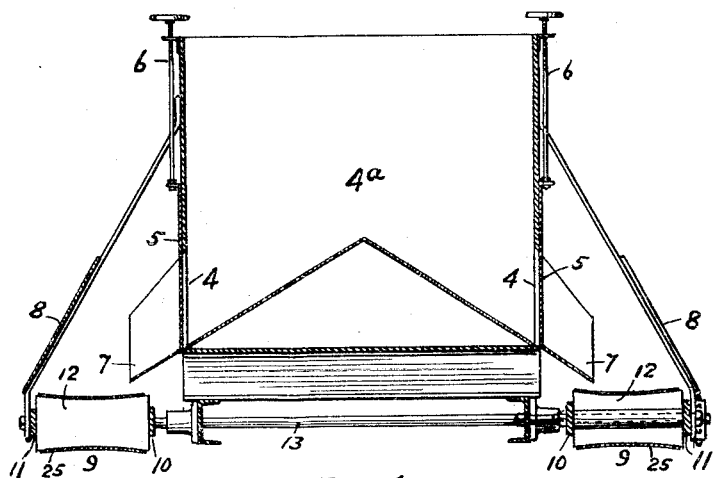
Fig. 4 is a sectional view taken on the line 4—4 of Fig. 2 showing the guards which are omitted in Figs. 1 and 2.

Referring to the drawings 1 is an automobile chassis having a power plant 2, which includes a driving wheel 3. $4^a$ is a body mounted on the chassis and provided with laterally arranged discharge openings 4. These, with the exception of the laterally arranged discharge openings, may constitute and be parts of an ordinary automobile truck. 5 are gates for adjustably opening and closing the openings 4. 6 are means shown as hand screws for adjusting the gates. 7 are chutes for the openings, and 8, Fig. 4, are guards for the chutes. 9, generally, are side frames, and they are shown to consist of bars 10 and 11 connected and held apart by suitable cross pieces, and the side frames are provided with concave pulleys 12 having shafts 13 and 14 that extend across the machine. The shaft 13 is geared by the chain 15 to the driving wheel 3, so that the shaft is driven by the power plant of the machine. 16 is a hopper carrier arranged at the front of the chassis. 17 is a hopper depending from the carrier 16 and extending across the front of the machine beyond the wheels, and it is provided with a hinged bottom 18. 19 is a hand screw for opening and closing the hinged bottom 18. 20 is a seat for the operator of the hand screw 19. 21 is a rotary central feeder arranged in the hopper and as shown it is provided with paddles 22 and 23 oppositely arranged so as to feed from the ends of the hopper toward the center. 24 is a chain for gearing the feeder to the shaft 14 which is driven from the shaft 13 by the belts or endless aprons 25 which pass around the pulleys 12 and constitute conveyors upon the upper faces of which chips are delivered in regulated quantities and by which the chips are conveyed forward and deposited in the hopper 21.

In use sand, gravel, chips, meaning fragments of stone, and the like are loaded into the body $4^a$, and the machine is driven over the surface upon which the material in the body is to be distributed. The conveyors 25 receive the chips which are prevented from falling off by the guards 8, and the conveyors deposit the chips in the hopper from which they are delivered in regulated quantity to the surface by the manipulation of the bottom 18. The feed reserves to insure proper passage of the chips through the hopper. Inasmuch as the hopper is at the front of the machine and extends across and beyond its wheels, the wheels of the machine travel on the chips, thus insuring good traction on a slippery surface and preventing the removal of bitumen which may have been deposited on the surface. An attendant seated on the seat 20 by means of the screw 19 may regulate the rate of discharge from the hopper and this attendant may signal to another attendant or attendants operating the gates 5 in response to the signal.

The machine can be used not only for distributing chips, as has been described, but also as a truck. For the latter purpose the chain 15 can be removed from the hopper and its accessories including the chain 24 can be taken off. In most cases the side frames 9 and their accessories can be permitted to remain in place as they do not interfere with truck use, but, if desired, they can be detached as units from the chassis. The ready convertibility of the machine from truck to distributing uses is a matter not only of great convenience but also of great economy.

It will be obvious to those skilled in the art that modifications may be made in details of construction and arrangement without departing from the spirit of the invention, hence the invention is not limited to such matters or otherwise than as the prior art and the appended claims may require.

I claim:

1. An automotive road machine adapted to distribute chips and the like upon the surfaces of roads and upon like surfaces comprising the combination of an automobile chassis including the power plant, a body mounted on the chassis and adapted to carry a load of chips and provided with laterally arranged chip discharge openings, a chip distributor arranged at and extending across the front of the chassis in advance of the front wheels thereof, conveyors arranged at the sides of the chassis and outside of the body and adapted to receive chips from the openings and to carry them forward and to deliver them to the distributor, and means for operating said parts from the power plant.

2. A road machine for spreading chips comprising in combination an automobile truck having a body provided with side gates, a distributor at the front of the truck in advance of the front wheels thereof, conveyors arranged at the sides of the truck and outside of the body and adapted to receive material discharged at the gates and to carry it forward to the distibutor, and mechanism operated by the power plant of the truck for driving the conveyors.

WILLIAM S. HAMMAKER.